Jan. 22, 1946.   E. F. ZAP ET AL   2,393,444
AERODYNAMIC CONTROL FOR AIRPLANES
Filed April 8, 1942   2 Sheets-Sheet 2

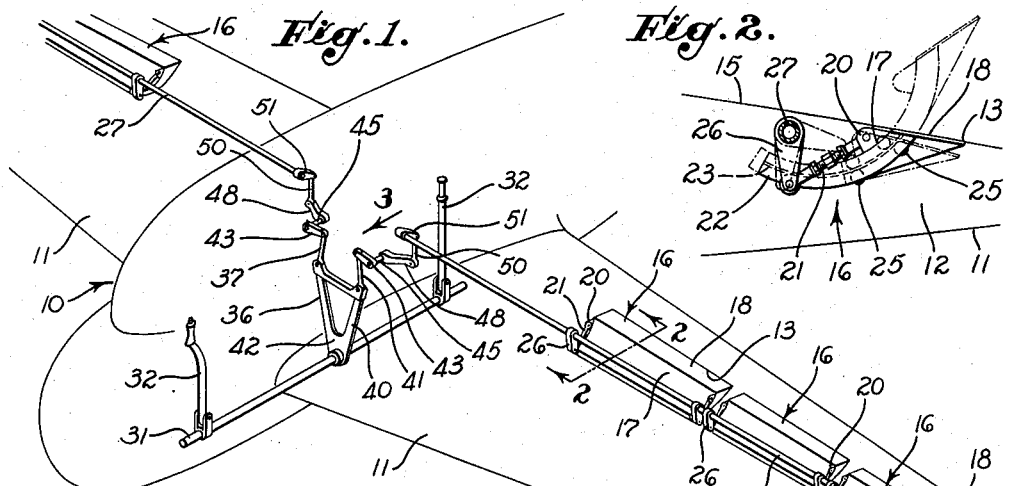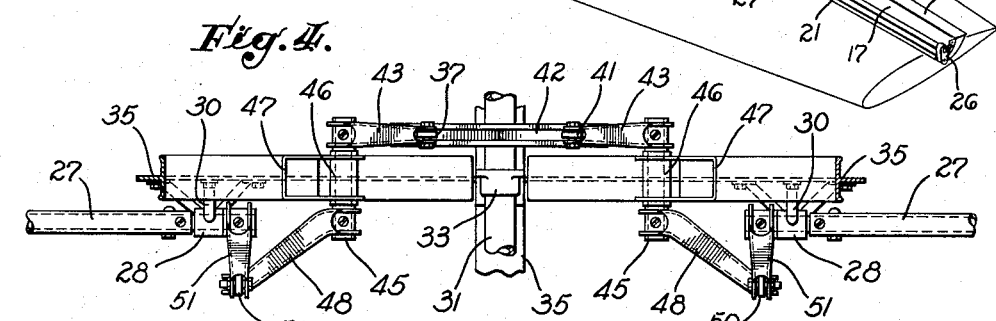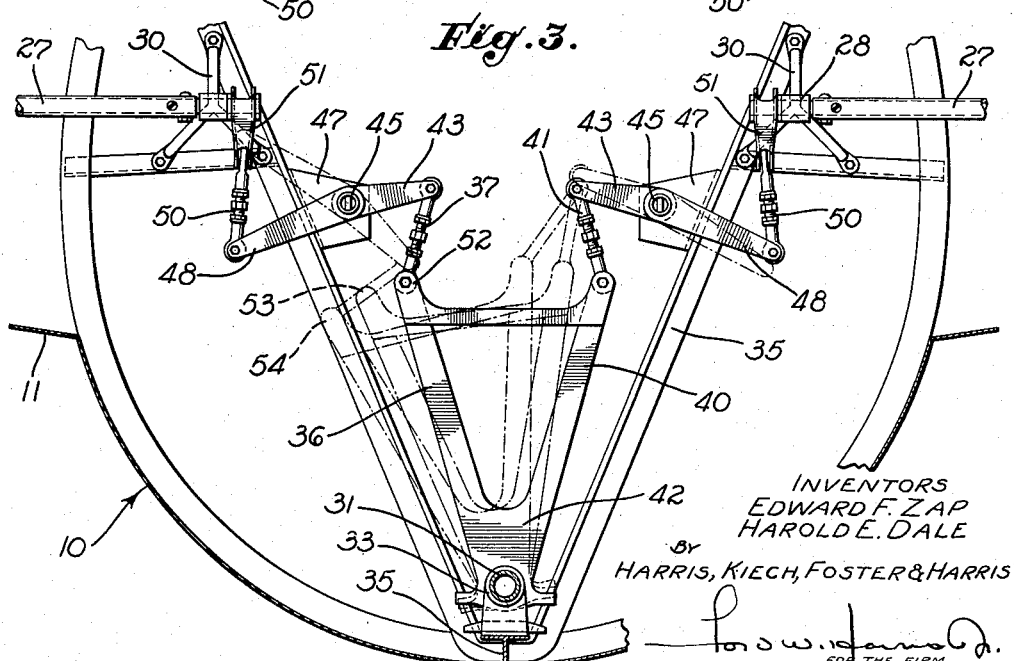

INVENTORS
EDWARD F. ZAP
HAROLD E. DALE
BY HARRIS, KIECH, FOSTER & HARRIS
FOR THE FIRM
ATTORNEYS

Patented Jan. 22, 1946

2,393,444

UNITED STATES PATENT OFFICE 2,393,444

AERODYNAMIC CONTROL FOR AIRPLANES

Edward F. Zap, Los Angeles, and Harold E. Dale, Hermosa Beach, Calif.; said Dale assignor to said Zap Application April 8, 1942, Serial No. 438,196

25 Claims. (Cl. 244—83)

Our invention relates to aircraft control systems involving pairs of aerodynamic members, such as pairs of ailerons or pairs of flaps, in which systems the two aerodynamic members have opposite flight-control effects and are both governed by a common means such as the usual control stick. While the invention is broadly applicable to various control problems in aircraft operation, it is being initially applied to the control of a pair of ailerons of a particular type. The description herein of such an embodiment of the invention will be adequate guidance for applying the underlying principles to other flight-control arrangements.

One general object of the invention is to provide a positive, reliable, and sensitive control for a cooperating pair of aerodynamic members or ailerons.

The present invention has evolved from the development in aileron control revealed in the copending Zap applications Serial No. 383,570 and Serial No. 401,319 both entitled "Aileron control." The specific inventions disclosed in these copending applications relate to a pair of ailerons that are mounted on the upper sides of airplane wings to extend variably upward into the air stream. When such an aileron extends upward into the air stream it creates certain effects that cause the airplane to change its position in flight as desired by the pilot. In making a right-hand turn, for example, the right-hand aileron is extended into the air stream with three results: first, the aileron disturbs the air stream to spoil the lift in the wing, thereby tending to cause the wing to drop; second, the air stream impinges on the inclined aileron surface and thereby further tends to cause the wing to drop; and, third, the aileron acting as an obstacle to the air stream increases the drag of the wing and thereby creates a yaw favoring the desired right-hand turn.

This line of development is characterized, in general, by the concept of providing a certain interaction between the two ailerons, the forces encountered by one aileron being transmitted to the other aileron. The interaction is exerted through the control system in a manner to be distinctly sensed by the pilot through the control stick and is provided for the purpose of facilitating skillful flying. One object of the present invention is to provide for such interaction without increasing the normal drag.

Another general object of the present invention is to improve the range and character of this type of interaction between the opposite ailerons of an airplane. In the structure set forth in the above-mentioned copending applications, the interaction between the ailerons is restricted to a central zone in the range of control stick movement and ceases when the pilot shifts the control stick laterally from "neutral" to any substantial degree. Some of the specific objects of the present invention are directed to certain problems that must be solved to permit the interaction between the ailerons to be effective over substantially the whole range of lateral movement of the control stick.

One of these problems is to extend the zone of interaction to the whole range of the control stick movement without involving aileron forces of excessive magnitude. Another problem is to extend the zone of interaction without involving excessive drag, especially in the outside wing on a banked turn. These problems offer some difficulty because in the prior arrangements both ailerons are normally extended into the air stream and any obvious expedient for widening the central zone of aileron interaction involves correspondingly increasing the normal extension of the ailerons into the air stream with consequent increase in normal drag. One of the features of the preferred form of the present invention is that the aileron in the outside wing on a banked turn may actually function in a manner to decrease the drag of the outside wing to a magnitude less than the inherent drag of the wing. The present solution to these particular problems involves an arrangement whereby neither aileron normally induces drag and whereby the aileron in the outside wing on a turn first retracts and then recovers as the control stick is moved laterally progressively to the limit position for making the turn.

In the arrangements described in the copending Zap applications, provision is made for automatically locking the aileron in the outside wing when the control stick is shifted beyond the limit of the above-mentioned central zone and, of course, the locking of the outside aileron terminates the interaction between the two ailerons. It is apparent that in such an arrangement the control stick has three zones in its range of lateral movement, namely, the central zone over which the control stick is sensitive to the interplay of the opposing forces and two outside zones in which the control stick is sensitive only to the forces on one aileron. In our present improvement the zones over which the control stick is insensitive to the interplay of aileron forces are reduced to mere points in the range of stick movement and certain specific objects of our improvement relate to the location of these two insensitive points. In the preferred practice of our invention the insensitive positions of the control stick are so located as not to be encountered during normal relatively straight flight and, on the other hand, are so located as not to be encountered when the airplane is maneuvered into a decided bank for a substantial change in direction.

One of the more important objects of the present invention is to provide an aileron system that will not only have the usual function of lateral flight control and not only provide interplay of aileron forces for the benefit of the pilot but also will serve the function of an exceedingly sensitive indicator to apprise the pilot of changing aerodynamic conditions. It is contemplated that the aileron system will serve in effect as a nerve to transmit messages to the pilot about changing aerodynamic factors and that the pilot will obtain information directly and instantly through the control stick instead of being forced to deduce that information from the subsequent resultant behavior of the airplane.

One of the objects of the invention is to minimize the normal dynamic pressure of the air stream on the ailerons, especially to minimize if not entirely eliminate dynamic pressure of the air stream against the aileron on the wing on the outside of a turn. When direct impingment of the air stream is substantially eliminated, the ailerons in an interacting arrangement respond to changes in the usual pressure of the air stream on the upper skin of each wing and the behavior of the control stick accurately reflects relative wing pressures.

The described sensitivity achieved in the present aileron arrangement differs both in degree and character from the sensitivity attained in the prior aileron arrangements. The arrangement is so sensitive that during normal flight a mild gust of wind creating only minor crossflow over a wing will cause at least a quiver in the control stick and the control stick's behavior will be directional in the sense of indicating the general direction of the gust and the required direction of stick movement to counteract the gust. The sensitivity of the new aileron arrangement also becomes apparent in the course of a banked turn, the behavior of the aileron clearly reflecting the fact that the rate of air flow across the inside aileron is less than the air flow across the outside aileron. Since human reactions are relatively slow compared to the exceedingly rapid rate at which events occur at high flying speeds, skillful flying requires that the pilot be given prompt indication of changing flight factors before the effects of the changing flight factors become manifest in the behavior of the ship. It is readily apparent that such sensitivity is of exceptional importance in formation flying.

A still further object of the invention is to provide an operating mechanism for a pair of opposite aileron panels by means of which the two ailerons may be moved simultaneously and synchronously upward to compensate for ground effect in landing an aircraft or to decrease the lift-drag ratio of the wings for any purpose.

These various objects and advantages of the invention, together with other objects and advantages, will be apparent in our following detailed description, taken with the accompanying drawings.

In the drawings:

Fig. 1 is a phantom perspective view of an aircraft showing our new aileron system more or less schematically;

Fig. 2 is a transverse section taken as indicated by the line 2—2 of Fig. 1;

Fig. 3 is a rear view of the control mechanism in the cockpit taken as indicated by the arrow 3 in Fig. 1;

Fig. 4 is a plan view of the mechanism shown in Fig. 3; and

Figure 5:
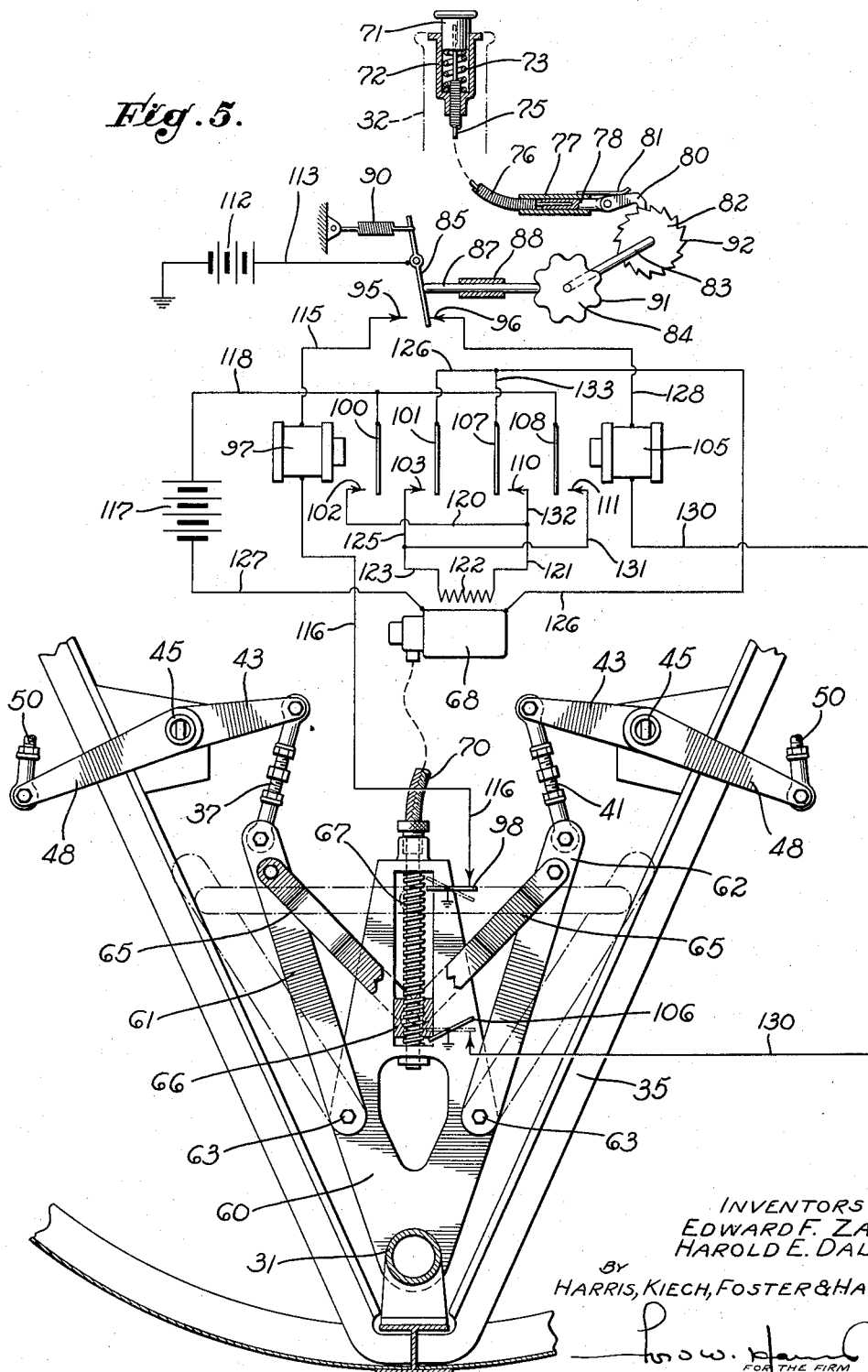
Fig. 5 is a view similar to Fig. 3 of a modified form of the control mechanism together with an associated wiring diagram.

Our invention may be applied to the control of various types of ailerons, but by way of example will be described as employed with ailerons of the type exemplified by the copending Zap applications Serial No. 430,721, entitled "Aerodynamic member," and Serial No. 427,236, entitled "Linkage mounting for aerodynamic members."

Fig. 1 shows a conventional airplane having a fuselage 10 and two wings 11. As indicated in Fig. 2 each of the wings has a rearward hollow portion 12 having an opening 13 in the upper skin 15 of the wing. It is contemplated that the ailerons of the aircraft will be mounted in the hollow portions 12 of the wings to extend and retract through the wing opening 13.

In the particular airplane depicted in Fig. 1 there are three aileron panels generally designated 16 in each of the wings 11. The panels fit between the usual ribs (not shown) in the wings 11 and may be structurally independent for operation at different rates but preferably are structurally interconnected in such manner that the three panels in each wing constitute one unitary aileron.

Each of the panels 16 has a forward or upper curved wall or skin 17, and an end plate 18, and is provided at each end with a projection 20 for pivotal connection with suitable operating means such as an operating rod 21. Each aileron panel is mounted in the airplane wing by means to cause the aileron panel to move along a curved path of operation having its center or centers of curvature in the air stream above the wing and forward of the aileron. The mounting means may comprise a guide-and-roller combination as set forth in the Zap application Serial No. 430,721, entitled "Aerodynamic member" or may comprise a special linkage disclosed in the Zap application Serial No. 427,236, entitled "Linkage mounting for aerodynamic members." In the present construction the guide-and-roller arrangement is contemplated. As indicated in Fig. 2 the end of each aileron panel 16 is provided with a curved guide or track 22 having an outwardly extending medial flange 23 curved to conform with the desired path of aileron operation. The flange 23 is in rolling engagement with four rollers 25 that rotate on fixed axes to confine movement of the guide means to the predetermined path.

In making a left-hand turn, for example, the aileron panels in the left wing of the airplane are extended upward into the air stream as indicated in dotted lines in Fig. 2, the effect being decrease in lift and increase in drag of the left wing.

The various operating rods 21 may be actuated in any suitable manner. In the particular arrangement shown in the drawings the operating rods are pivotally connected to corresponding arms 26 on shafts 27, there being one shaft in each wing. Each of the operating shafts 27 extends through the ribs of the wing and is journaled in suitable bearings such as the bearings 28 supported by struts 30 in Figs. 3 and 4.

The aileron control means in the cockpit of the aircraft may comprise a torque tube 31 carrying two control sticks 32 (Fig. 1), the torque tube being journaled in suitable bearings 33 that are mounted in the fuselage frame 35. This control means comprising the torque tube and control sticks is operatively connected to each of the shafts 27 by a suitable mechanism constructed and arranged to produce the character of aileron control discussed above. Preferably the control means is connected to each of the shafts by mechanism that includes a toggle linkage. Thus a lower toggle link 36 may be connected to an upper toggle link 37 on one side and a lower toggle link 40 may cooperate with an upper toggle link 41 on the other side. Since it is contemplated that the two lower toggle links 36 and 40 will move in unison about the axis of the torque tube 31, we prefer to make the two lower links integral parts of a central control yoke 42 that is fixedly mounted on the tongue tube as indicated in the drawings.

Each of the toggle links 37 and 41 is pivotally connected to a corresponding arm 43 on a corresponding stub shaft 45, the stub shaft being journaled in a suitable bearing 46 carried by a bracket 47 on the fuselage frame 35. Keyed to each of the stub shafts 45 is a second arm 48 that is connected by a suitable link 50 to a corresponding arm 51 on the corresponding shaft 27.

Fig. 3 indicates three different positions of the control yoke 42, namely, a normal or neutral position 52 shown in solid lines for normal flight straight ahead, an intermediate "dead-center" position 53 shown in dotted lines, and an extreme or limit position 54. The three positions 52, 53, and 54 in Fig. 3 may be regarded as defining two zones of control stick operation on one side of the neutral position of the control stick. Thus, positions 52 and 53 represent the limits of an inner zone, there being two such inner zones one on each opposite side of the neutral position of the control stick, and the positions 53 and 54 define an outer zone, there being two such outer zones on opposite sides of the neutral position of the control stick. During normal flight in any given direction or during maneuvers involving only gradual changes in direction of the ship, the pilot does not move the control stick outside the range represented by the two described inner zones. On the other hand, during rapidly executed maneuvers involving abrupt changes of direction the pilot manipulates the control stick within one of the two described outer zones.

The importance of this general relationship lies in the fact that the transition point between the two zones on each side of the neutral position of the control stick coincides with the "dead-center" position of one of the two toggle linkages. At the "dead-center" position of either pair of toggle links the pair of toggle links is ineffective for transmitting forces between the corresponding aileron shaft 27 and the torque tube 31. Since the two insensitive positions of the control stick on the two opposite sides of the neutral position of the control stick, i. e., the "dead-center" positions of the two pairs of toggle linkages, lie at the transition points between the inner and outer zones of the control stick manipulation, the pilot only rarely causes the control stick to pause at a position cutting off interaction between the ailerons on opposite sides of the ship.

It will be noted that in the course of the movement of the control yoke 42 from the neutral or normal position 52 to the extreme or limit position 54, the pair of control links 36 and 37 progressively rotates the arm 43 on one side of the cockpit downwardly while the other pair of toggle links 40 and 41 initially moves the other arm 43 on the other side of the cockpit upwardly and then passing through the "dead center" reverses the movement of said arm 43 downwardly. It follows, then, that when a control stick is swung from its neutral position laterally to one of its extreme positions, the aileron in one wing of the airplane is progressively moved to maximum extension and concurrently the aileron in the other wing is first retracted and is then returned to normal position.

In various practices of our invention the described control mechanism may maintain the ailerons at various positions when the pilot holds the control stick at the neutral position for normal straight flight. In some practices of the invention, for example, each aileron may normally be extended slightly above the upper skin of the airplane wing. In the preferred practice of our invention, however, the normal position of each aileron panel 16 is a position at which the end plate or deflecting plate 18 of the panel is substantially flush with the upper skin of the wing. If each aileron is normally in such flush position, it follows that movement of the control stick laterally from neutral position to one of the limit positions of the stick will cause one aileron to extend progressively into the air stream and will cause the other aileron to concurrently dip to a negative angle inside the wing and then recover. In making a relatively abrupt lefthand turn, for example, the pilot would move the control stick to the left as seen in Fig. 3, thereby causing the left aileron to move upward into the air stream and causing the right aileron initially to dip into the right wing and then recover. The extension of the left aileron into the air stream would tend both to lower and to retard the left wing while the retraction of the aileron in the right wing to negative angles would tend to decrease the drag in the right wing to less than normal and thereby further favor the desired change in direction.

When the pilot swings the control stick laterally to one side thereby extending one aileron into the air stream, any tendency of the extended aileron to retract or to extend is transmitted to the control stick and, on the other hand, any tendency of the retracted aileron to move is likewise transmitted to the control stick. Usually the forces derived from the extended aileron greatly exceed the forces transmitted by the retracted aileron so that usually the reaction force felt by the pilot at the control stick rather closely represents the forces transmitted by the extended aileron. It is contemplated that the tendency of an aileron to move along its path will vary with the extension of the aileron so that normally the magnitude of the force felt by the pilot at the control stick corresponds to the degree to which the control stick is swung laterally away from its normal neutral position. The variation of the force sent through the control stick with variation of the angle of the control stick from its neutral position greatly assists the pilot to fly the airplane skillfully.

When the ailerons on opposite sides of the ship are at or near their normally flush positions, any change in the air streams over either wing results in change in air pressure on the wing, which change in pressure is immediately indicated to the pilot. It is apparent that the described arrangement not only provides for mechanically controlling the ailerons but also serves as means indicative of aerodynamic conditions for guidance of the pilot in the manipulation of the ailerons.

Fig. 5 indicates how the above described control system may be modified to permit the pilot to move both ailerons simultaneously whenever desired. The control mechanism of Fig. 5 is largely identical with the control mechanism heretofore described, corresponding numerals indicating corresponding parts.

In the modified arrangement shown, a control yoke 60 mounted on the torque tube 31 carries two lower toggle links 61 and 62, the two links being mounted on the control yoke by pivots 63. The lower toggle link 61 is connected to the previously described upper toggle link 37 to form the toggle linkage on one side of the control yoke and the lower toggle link 62 is connected to the previously mentioned upper toggle link 41 to form a toggle linkage on the other side of the control yoke.

The purpose of pivotally mounting the two lower control arms 61 and 62 on the control yoke 60 is to permit the two lower toggle links to be swung apart or together by a suitable control mechanism independent of normal aileron operation. It is apparent that if the two lower toggle links 61 and 62 are swung apart into greater divergence, the result will be simultaneous extension of both aileron panels 16, thereby causing a sharp drop in the lift exerted by the two aircraft wings.

Such an operation of the two aileron panels causing a tendency for the plane to drop may be of service to compensate for "ground effect." When an aircraft makes a gliding approach to the elevated deck of an aircraft carrier, for example, the abrupt ground effect resulting from the sudden reduction in the vertical space beneath the aircraft tends to sustain the aircraft and to delay contact with the landing deck. Timely elevation of the two aileron panels simultaneously, however, permits an aircraft of the present type to maintain the desired glide angle relative to the aircraft and in fact to increase the glide angle to a desirable extent at the proper moment. It is apparent that the simultaneous upward movement of the two ailerons may also be of service in increasing the glide angle of the plane under other circumstances.

Any suitable means may be employed to spread apart and draw together the two lower toggle links 61 and 62. In the construction shown, the two toggle links are connected respectively to a pair of control links 65 that are in turn connected to a threaded collar 66 on a worm 67. The worm 67 is actuated by a motor 68 through the medium of a flexible shaft 70.

For the convenience of the pilot, means for controlling the motor 68 may comprise a thumb-operated plunger 71 on the end of one or both of the control sticks 32 in the cockpit. In the particular arrangement shown, the plunger 71 is slidingly mounted in a small cylinder 72 and is normally in its upper or extended position by virtue of a spring 73 within the plunger. The plunger is connected to a flexible operating cable 75 in a flexible sheath 76, the sheath terminating in a stationary guide sleeve 77 and the cable 75 terminating in and controlling the plunger 78.

Pivotally mounted on the end of the plunger 78 is a pawl 80 that is continually pressed by a leaf-spring 81 against a ratchet wheel 82, the ratchet wheel being mounted on a shaft 83 to control a cam wheel 84. The purpose of the cam wheel 84 is to control the disposition of a master switch 85 through the medium of a slide rod 87 in a slide bearing 88. A suitable spring 90 continuously urges the master switch 85 against the end of the slide rod, thereby continuously urging the slide rod against the periphery of the cam wheel 84. Since the cam wheel 84 has a uniformly undulating periphery to provide a series of uniformly spaced rises 91, and since there are twice as many teeth 92 on the ratchet wheel as rises on the cam wheel, successive depressions of the thumb-operated plunger 71 cause the master switch 85 to move in opposite directions. Thus, one operation of the thumb-operated plunger 71 moves the master switch 85 to its left position and the succeeding operation of the plunger 71 returns the master switch to its right position, thereby causing the master switch to alternate between a left contact 95 and a right contact 96.

Associated with the left contact 95 is a left relay 97 and a limit switch 98, the limit switch being on the control yoke 60 near the upper end of the worm 67. The left relay 97 has two contactor switches 100 and 101 that are normally in open positions. When the left relay 97 is energized, the two contactor switches are moved against contacts 102 and 103 respectively. Associated with the right contact 96 is a right relay 105 and a limit switch 106, the limit switch being on the control yoke 60 near the lower end of the worm 67. The right relay 105 has two contactor switches 107 and 108 that are normally in open positions. When the right relay 105 is energized, the two contactor switches are moved against contacts 110 and 111 respectively.

Assuming the parts to be in the position shown in Fig. 5, depression of the thumb-operated plunger 71 causes the master switch 85 to be moved leftward, thereby establishing the following relay circuit: grounded relay battery 112, wire 113, master switch 85, contact 95, wire 115, relay 97, wire 116, and limit switch 98 to ground. The consequent energization of the relay 97 closing the two contactor switches 100 and 101 energizes the motor 68 by the following circuit: motor battery 117, wire 118, contactor switch 100, contact 102, wire 120, wire 121, field coil 122, wire 123, wire 125, contact 103, contactor switch 101, wire 126, commutator of the motor 68, and wire 127 back to the battery. The energization of the motor 68 causes the worm 67 to rotate and move the threaded collar 66 upward from the lowermost position shown in Fig. 5. Initial upward movement of the threaded collar 66 permits the limit switch 106 to close and at the end of its movement the threaded collar moves against the limit switch 98, thereby breaking the circuit through the left relay 97 and causing the motor 68 to be deenergized.

If now the thumb-operated plunger 71 is again depressed to cause the master switch 85 to be moved rightward, the following relay circuit is established: grounded relay battery 112, wire 113, master switch 85, contact 96, wire 128, right relay 105, wire 130, and limit switch 106 to ground. The consequent energization of the right relay 105 establishes the following motor circuit: motor battery 117, wire 118, contact 111, wire 131, wire 123, field coil 122, wire 121, wire 132, contact 110, contactor switch 107, wire 133, wire 126, commutator of the motor 68, and wire 127 back to the battery 117. This circuit is the reverse of the above described motor circuit with respect to the current flow through the field coil 122. The energization of the motor 68 by this last circuit causes downward movement of the threaded collar 66, the initial movement of the collar permitting the limit switch 98 to close and the end movement of the collar causing the limit switch 106 to open.

It is contemplated that the movement of the threaded collar 66 in either direction will be completed rapidly so that the ailerons may be simultaneously elevated or simultaneously lowered in a very few seconds. Since the control provided by movement of the threaded collar 66 is independent of the control provided by the control sticks 32, it is apparent that while the two ailerons are being raised or lowered, the relative extensions of the two ailerons may be varied by movements of a control stick 32 for simultaneous lateral control of the airplane.

Our specific disclosure will suggest to those skilled in the art various changes, modifications, and substitutions within the scope of the underlying concepts, and we specifically reserve the right to all such departures that properly come within the scope of our appended claims.

We claim as our invention:

1. A control system for an aircraft, comprising in combination: two aerodynamic members disposed on opposite sides of the aircraft for opposite flight-control effects, each of said control members being operative in a direction of increasing control effect and in an opposite direction of decreasing control effect; control means movable from a neutral position in a first control direction and in a second control direction for opposite flight control effects; means operatively connecting said control means with one of said aerodynamic members to cause the aerodynamic member to move in its direction of increasing control effect when the control means is moved progressively in said first control direction from neutral and when the control means is moved progressively in said second control direction from neutral to cause said aerodynamic member to move initially in its direction of decreasing control effect and then reverse; and means operatively connecting said control means with the other of said aerodynamic members to cause said other aerodynamic member to move in its direction of increasing control effect when the control means is moved progressively in said second control direction from neutral and when the control means is moved progressively in said first control direction from neutral to cause said other aerodynamic member to move initially in its direction of decreasing control effect and then reverse.

2. A control system for an aircraft, comprising in combination: two aerodynamic members disposed on opposite sides of the aircraft for opposite flight-control effects, each of said control members being operative in a direction of increasing control effect and in an opposite direction of decreasing control effect; manual control means movable from a neutral position in a first control direction and in a second control direction for opposite flight-control effects; means including a linkage operatively connecting said control means with one of said aerodynamic members, said linkage being arranged to move away from a dead center position to progressively move said areodynamic member in its direction of increasing control effect when said control means is moved progressively in said first control direction from neutral and when the control means is moved progressively in said second control direction from neutral to move through the dead center position to cause the aerodynamic member to move initially in its direction of decreasing control effect and then reverse; and means including a linkage operatively connecting said control means with the other of said aerodynamic members, said linkage being arranged to move away from a dead center position to progressively move said other aerodynamic member in its direction of increasing control effect when said control means is moved progressively in said second control direction and when the control means is moved progressively in said first control direction from neutral to move through its dead center position to cause said other aerodynamic member to initially move in its direction of decreasing control effect and then reverse.

3. A control system as set forth in claim 2, in which said two linkages comprise two pairs of toggle elements that are oppositely disposed whereby one pair moves toward its dead center position when the other pair moves away from its dead center position and vice versa.

4. In an aircraft, the combination of: two aerodynamic members mounted in hollow portions of the aircraft at opposite sides of the aircraft, each of said aerodynamic members being movable between an inner position and an outer position extending into the air stream outside the aircraft; a control means movable from a neutral position in a first control direction and in a second control direction for opposite flight-control effects; means operatively connecting said control means with one of said aerodynamic members to cause the aerodynamic member to move progressively outward when the control means is moved progressively in said first control direction from neutral and when the control means is moved progressively in said second control direction from neutral to cause the aerodynamic member to move initially inward and then reverse; and means operatively connecting said control means with the other of said aerodynamic members to cause said other aerodynamic member to move progressively outward when the control means is moved progressively in said second control direction from neutral and when the control means is moved progressively in said first control direction from neutral to cause said other aerodynamic member to move initially and then reverse.

5. In combination with an airplane an aileron system, comprising: two ailerons mounted on the opposite wings of the airplane, each aileron being movable through an opening in the wing; control means movable from a neutral position in a first control direction and in a second control direction for opposite flight-control effects; means operatively connecting said control means with one of said ailerons to cause the aileron to move progressively outward from a normal position when the control means is moved progressively in said first control direction from neutral and when the control means is moved progressively in said second control direction from neutral to cause said aileron to move into the wing from its normal position and then reverse; and means operatively connecting said control means with the other of said ailerons to cause said other aileron to move outward from a normal position when the control means is moved progressively in said second control direction from neutral and when the control means is moved in said first control direction from neutral to cause said other aileron to move into the wing from its normal position and then reverse.

6. An aileron system as set forth in claim 5, in which both said ailerons are normally substantially completely out of the path of the air stream when said control means is at its neutral position whereby normally neither aileron is effective to substantially increase the drag of the airplane.

7. An aileron system as set forth in claim 5, in which both of said ailerons are normally positioned substantially at the surface of the airplane wings whereby one aileron initially dips completely inside the wing when the other aileron is extended.

8. An aileron system as set forth in claim 5, in which the positions of said control means at which said reversals of the ailerons occur are outside the normal range of movement of the control means required for normal flight without abrupt turns.

9. In combination with an airplane an aileron system, comprising: two ailerons mounted on the opposite wings of the airplane, each aileron being movable outward through an opening in the wing to various positions in the air stream; control means movable from a neutral position in a first control direction and in a second control direction for opposite flight-control effects; means including a pair of toggle elements operatively connecting said control means with one of said ailerons to cause the aileron to move progressively outward when the control means is moved progressively in said first control direction from neutral and when the control means is moved progressively in said second control direction from neutral to cause the aileron member to move initially inward and then reverse; and means including a pair of toggle elements operatively connecting said control means with the other of said ailerons to cause said other aileron to move progressively outward when the control means is moved progressively in said second control direction from neutral and when the control means is moved progressively in said first control direction from neutral to cause said other aileron to move initially inward and then reverse.

10. An aileron system as set forth in claim 9, in which the dead center positions of each of said pairs of toggle elements occur when said control means is approximately half way between its central neutral position and one of its limit positions.

11. A control system for an aircraft as set forth in claim 1, in which auxiliary means independent of operation of said control means is provided to cause both said aerodynamic members to move simultaneously either in their directions of increasing control effect or in their directions of decreasing control effect.

12. A control system for an aircraft as set forth in claim 2, in which auxiliary means independent of operation of said control means is provided to move both said linkages either simultaneously in directions toward their respective dead center positions or simultaneously in directions away from their respective dead center positions.

13. A control system for an aircraft, comprising in combination: two aerodynamic members disposed on opposite sides of the aircraft for opposite flight-control effects; primary control means movable from a neutral position in a first and a second control direction; primary actuating means between each of said members and said control means, each of said primary actuating means including a link, said actuating means being adapted when said primary control means is progressively moved from neutral position in said first or second control directions for moving said links in the same direction, whereby either one of said members may be moved initially in its direction of decreasing control effect and then in an opposite direction while the other of said members is moved in its direction of increasing control effect; auxiliary actuating means associated with said links and adapted for moving them in opposite directions, whereby said members are simultaneously actuated in their directions of increasing control effect or their directions of decreasing control effect; and auxiliary control means associated with and carried by said primary control means and associated in controlling relationship with said auxiliary actuating means.

14. A control system for an aircraft, comprising in combination: two aerodynamic members disposed on opposite sides of the aircraft for opposite flight-control effects; primary control means movable from a neutral position in a first and a second control direction; primary actuating means between each of said members and said control means, each of said primary actuating means including a link, said actuating means being adapted when said primary control means is progressively moved from neutral position in said first or second control directions for moving said links in the same direction, whereby either one of said members may be moved initially in its direction of decreasing control effect and then in an opposite direction while the other of said members is moved in its direction of increasing control effect; auxiliary actuating means associated with said links and adapted for moving them in opposite directions, whereby said members are simultaneously actuated in their directions of increasing control effect or their directions of decreasing control effect; and auxiliary control means so associated with said auxiliary actuating means that said members are actuated alternately to limit positions of increasing and decreasing control effects upon successive operations of said auxiliary control means.

15. A control system for an aircraft, comprising in combination: two aerodynamic members disposed on opposite sides of the aircraft for opposite flight-control effects; primary control means movable from a neutral position in a first and a second control direction; primary actuating means between each of said members and said control means, each of said primary actuating means including a link, said actuating means being adapted when said primary control means is progressively moved from neutral position in said first or second control directions for moving said links in the same direction, whereby either one of said members may be moved initially in its direction of the decreasing control effect and then in an opposite direction while the other of said members is moved in its direction of increasing control effect; auxiliary actuating means associated with said links and adapted for moving them in opposite directions, whereby said members are simultaneously actuated in their directions of increasing control effect or their directions of decreasing control effect; and auxiliary control means associated with and carried by said primary control means and so associated with said auxiliary actuating means that said members may be moved responsive to both simultaneous and separate operation of said primary and said secondary control means.

16. A control system for an aircraft, comprising in combination: two aerodynamic members disposed on opposite sides of the aircraft for opposite flight-control effects; primary control means movable from a neutral position in a first and a second control direction; primary actuating means between each of said members and said control means, each of said primary actuating means including a link, said actuating means being adapted when said primary control means is progressively moved from neutral position in said first or second control directions for moving said links in the same direction, whereby either one of said members may be moved initially in its direction of decreasing control effect and then in an opposite direction while the other of said members is moved in its direction of increasing control effect; auxiliary actuating means associated with said links and adapted for moving them in opposite directions, whereby said members are simultaneously actuated in their directions of increasing control effect or their directions of decreasing control effect; an electric motor adapted for actuating said auxiliary actuating means; a source of electric current; and current control means adapted for connecting said motor to said source in alternating reversed relationships, whereby said members are moved alternately to limit positions of increasing and decreasing control effects upon successive operations of said current control means.

17. A control system for an aircraft, comprising in combination: two aerodynamic members disposed on opposite sides of the aircraft for opposite flight-control effects; primary control means movable from a neutral position in a first and a second control direction; primary actuating means between each of said members and said control means, each of said primary actuating means including a link, said actuating means being adapted when said primary control means is progressively moved from neutral position in said first or second control directions for moving said links in the same direction, whereby either one of said members may be moved in its direction of increasing control effect while the other of said members is moved in its direction of decreasing control effect; auxiliary actuating means associated with said links and adapted for moving them in opposite directions, whereby said members are simultaneously actuated in their directions of increasing control effect or their directions of decreasing control effect; an electric motor adapted for actuating said auxiliary actuating means; a source of electric current; and current control means adapted for connecting said motor to said source in alternating reversed relationships, whereby said members are moved alternately to limit positions of increasing and decreasing control effects upon successive operations of said current control means.

18. A control system for an aircraft, comprising in combination: two aerodynamic members disposed on opposite sides of the aircraft for opposite flight-control effects; primary control means movable from a neutral position in a first and a second control direction; primary actuating means between each of said members and said control means, each of said primary actuating means including a link, said actuating means being adapted when said primary control means is progressively moved from neutral position in said first or second control directions for moving said links in the same direction, whereby each of said members may be moved initially in its direction of decreasing control effect and then in an opposite direction while the other of said members is moved in its direction of increasing control effect; auxiliary actuating means associated with said links and adapted for moving them in opposite directions, whereby said members are simultaneously actuated in their directions of increasing control effect or their directions of decreasing control effect; an electric motor adapted for actuating said auxiliary actuating means; a source of electric current; and current control means carried by said primary control means adapted for connecting said motor to said source in alternating reversed relationships, whereby said members are moved alternately to limit positions of increasing and decreasing control effects upon successive operations of said current control means.

19. A control system for an aircraft, comprising in combination: two aerodynamic members disposed on opposite sides of the aircraft for opposite flight-control effects; primary control means movable from a neutral position in a first and a second control direction; primary actuating means between each of said members and said control means, each of said primary actuating means including a link, said actuating means being adapted when said primary control means is progressively moved from neutral position in said first or second control directions for moving said links in the same direction, whereby either one of said members may be moved initially in its direction of decreasing control effect and then in an opposite direction while the other of said members is moved in its direction of increasing control effect; auxiliary actuating means associated with said links and adapted for moving them in opposite directions, whereby said members are simultaneously actuated in their directions of increasing control effect or their directions of decreasing control effect; an electric motor adapted for actuating said auxiliary actuating means; a source of electric current; current control means adapted for connecting said motor to said source in alternating reversed relationships, whereby said members are moved alternately to limit positions of increasing and decreasing control effects upon successive operations of said current control means; and means operatively connecting said current control means and said motor, whereby said motor is connected to said source after operation of said current control means until said members reach one of their said limit positions.

20. A control system for an aircraft, comprising in combination: two aerodynamic members disposed on opposite sides of the aircraft for opposite flight-control effects; primary control means movable from a neutral position in a first and a second control direction; primary actuating means between each of said members and said control means, each of said primary actuating means including a link, said actuating means being adapted when said primary control means is progressively moved from neutral position in said first or second control directions for moving said links in the same direction, whereby either one of said members may be moved in its direction of increasing control effect while the other of said members is moved in its direction of decreasing control effect; auxiliary actuating means associated with said links and adapted for moving them in opposite directions, whereby said members are simultaneously actuated in their directions of increasing control effect or their directions of decreasing control effect; an electric motor adapted for actuating said auxiliary actuating means; a source of electric current; current control means adapted for connecting said motor to said source in alternating reversed relationships, whereby said members are moved alternately to limit positions of increasing and decreasing control effects upon successive operations of said current control means; and means operatively connecting said current control means and said motor, whereby said motor is connected to said source after operation of said current control means until said members reach one of their said limit positions.

21. A control system for an aircraft, comprising in combination: two aerodynamic members disposed on opposite sides of the aircraft for opposite flight-control effects; primary control means movable from a neutral position in a first and a second control direction; primary actuating means between each of said members and said control means, each of said primary actuating means including a link, said actuating means being adapted when said primary control means is progressively moved from neutral position in said first or second control directions for moving said links in the same direction, whereby either one of said members may be moved intially in its direction of decreasing control effect and then in an opposite direction while the other of said members is moved in its direction of increasing control effect; auxiliary actuating means associated with said links and adapted for moving them in opposite directions, whereby said members are simultaneously actuated in their directions of increasing control effect or their directions of decreasing control effect; an electric motor adapted for actuating said auxiliary actuating means; a source of electric current; current control means adapted for connecting said motor to said source in alternating reversed relationships, whereby said members are moved alternately to limit positions of increasing and decreasing control effects upon successive operations of said current control means; means operatively connecting said current control means and said motor, whereby said motor is connected to said source after operation of said current control means until said members reach one of their said limit positions; and circuit control means associated with said auxiliary actuating means and adapted for automatically disconnecting said motor from said source when said members reach either of their said limit positions.

22. A control system for an aircraft, comprising in combination: two aerodynamic members disposed on opposite sides of the aircraft for opposite flight-control effects; primary control means movable from a neutral position in a first and a second control direction; primary actuating means between each of said members and said control means, each of said primary actuating means including a link, said actuating means being adapted when said primary control means is progressively moved from neutral position in said first or second control directions for moving said links in the same direction, whereby either one of said members may be moved in its direction of increasing control effect while the other of said members is moved in its direction of decreasing control effect; auxiliary actuating means associated with said links and adapted for moving them in opposite directions, whereby said members are simultaneously actuated in their directions of increasing control effect or their directions of decreasing control effect; an electric motor adapted for actuating said auxiliary actuating means; a source of electric current; current control means adapted for connecting said motor to said source in alternating reversed relationships, whereby said members are moved alternately to limit positions of increasing and decreasing control effects upon successive operations of said current control means; means operatively connecting said current control means and said motor, whereby said motor is connected to said source after operation of said current control means until said members reach one of their said limit positions; and circuit control means associated with said auxiliary actuating means and adapted for automatically disconnecting said motor from said source when said members reach either of their said limit positions.

23. A control system for an aircraft, comprising in combination: two aerodynamic members disposed on opposite sides of the aircraft for opposite flight-control effects; primary control means movable from a neutral position in a first and a second control direction; primary actuating means between each of said members and said control means, each of said primary acuating means including a link, said actuating means being adapted when said primary control means is progressively moved from neutral position in said first or second control directions for moving said links in the same direction, whereby either one of said members may be moved initially in its direction of decreasing control effect and then in an opposite direction while the other of said members is moved in its direction of increasing control effect; auxiliary actuating means associated with said links and adapted for moving them in opposite directions, whereby said members are simultaneously actuated in their directions of increasing control effect or their directions of decreasing control effect; an electric motor adapted for actuating said auxiliary actuating means; a source of electric current; current control means adapted for connecting said motor to said source; means operatively connecting said current control means and said motor, whereby said motor is connected to said source after operation of said current control means until said members reach one of their said limit positions; and switch means associated with said auxiliary actuating means and adapted for automatically disconnecting said motor from said source and reversing the connection of said motor to said source through said current control means, whereby said motor is actuated in opposite directions upon successive operations of said current control means.

24. A control system for an aircraft, comprising in combination: two aerodynamic members disposed on opposite sides of the aircraft for opposite flight-control effects; primary control means movable from a neutral position in a first and a second control direction; primary actuating means between each of said members and said control means, each of said primary actuating means including a link, said actuating means being adapted when said primary control means is progressively moved from neutral position in said first or second control directions for moving said links in the same direction, whereby either one of said members may be moved initially in its direction of decreasing control effect and then in an opposite direction while the other of said members is moved in its direction of increasing control effect; auxiliary actuating means associated with said links and adapted for moving them in opposite directions, whereby said members are simultaneously actuated in their directions of increasing control effect or their directions of decreasing control effect; an electric motor adapted for actuating said auxiliary actuating means; a source of electric current; current control means carried by said primary control means adapted for connecting said motor to said source in alternating reversed relationships, whereby said members are moved alternately to limit positions of increasing and decreasing control effects upon successive operations of said current control means; means operatively connecting said current control means and said motor, whereby said motor is connected to said source after operation of said current control means until said members reach one of their said limit positions; and circuit control means associated with said auxiliary actuating means and adapted for automatically disconnecting said motor from said source when said members reach either of their said limit positions.

25. A control system for an aircraft, comprising in combination: two aerodynamic members disposed on opposite sides of the aircraft for opposite flight-control effects; primary control means movable from a neutral position in a first and a second control direction; primary actuating means between each of said members and said control means, each of said primary actuating means including a link, said actuating means being adapted when said primary control means is progressively moved from neutral position in said first or second control directions for moving said links in the same direction, whereby either one of said members may be moved initially in its direction of decreasing control effect and then in an opposite direction while the other of said members is moved in its direction of increasing control effect; auxiliary actuating means associated with said links and adapted for moving them in opposite directions, whereby said members are simultaneously actuated in their directions of increasing control effect or their directions of decreasing control effect; an electric motor adapted for actuating said auxiliary actuating means; a source of electric current; current control means carried by said primary control means adapted for connecting said motor to said source; means operatively connecting said current control means and said motor, whereby said motor is connected to said source after operation of said current control means until said members reach one of their said limit positions; and switch means associated with said auxiliary actuating means and adapted for automatically disconnecting said motor from said source and reversing the connection of said motor to said source through said current control means, whereby said motor is actuated in opposite directions upon successive operations of said current control means.

EDWARD F. ZAP.
HAROLD E. DALE.